United States Patent [19]
Sugihara et al.

[11] Patent Number: 5,924,205
[45] Date of Patent: Jul. 20, 1999

[54] PROTECTION COVER FOR A TRIMMER

[75] Inventors: Tomohito Sugihara; Hajime Tomita, both of Gifu-ken, Japan

[73] Assignee: Diatop Corporation, Gifu-ken, Japan

[21] Appl. No.: 08/899,652

[22] Filed: Jul. 24, 1997

[30] Foreign Application Priority Data

Jul. 31, 1996 [JP] Japan ................................ 8-201657

[51] Int. Cl.$^6$ .................................................. B26B 29/00
[52] U.S. Cl. ........................... 30/276; 30/286; 30/DIG. 5
[58] Field of Search ............................. 30/276, 286, 347, 30/DIG. 5

[56] References Cited

U.S. PATENT DOCUMENTS

| | | | |
|---|---|---|---|
| 4,744,148 | 5/1988 | Brown | 30/276 |
| 4,864,728 | 9/1989 | Kloft et al. | 30/276 |
| 4,890,389 | 1/1990 | Whitkop | 30/276 |
| 5,423,126 | 6/1995 | Byrne | 30/276 |
| 5,493,784 | 2/1996 | Aiyama | 30/276 |
| 5,524,349 | 6/1996 | Dolin | 30/276 |

FOREIGN PATENT DOCUMENTS 246653  12/1990  Japan.

*Primary Examiner*—Hwei-Siu Payer
*Attorney, Agent, or Firm*—Stetina Brunda Garred & Brucker

[57] ABSTRACT

A protection cover for a trimmer is disclosed. The protection cover includes a protection portion that is comprised of plural elastic members. The protection portion prevent chips such as grasses trimmed or small stones inside of the cover. Each of the elastic members is shaped to a strip in an embodiment. The protection cover also includes a member of adjusting a vertical position of the protection portion.

29 Claims, 17 Drawing Sheets

Fig. 15
Fig. 15A
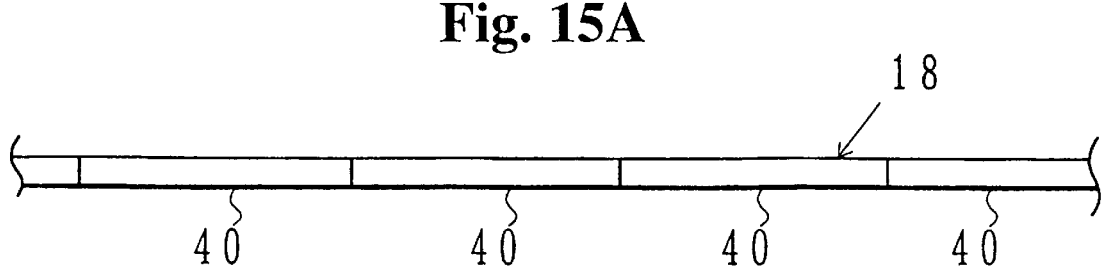
Fig. 15B
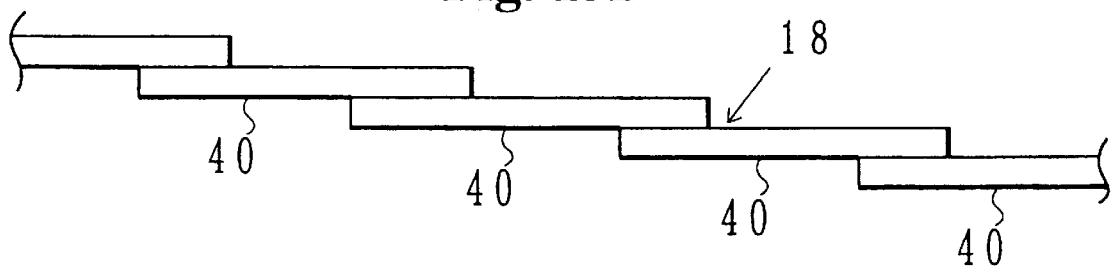
Fig. 15C
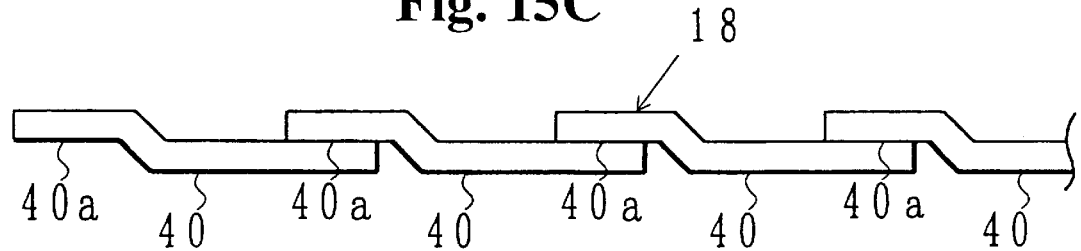

PROTECTION COVER FOR A TRIMMER

BACKGROUND OF THE INVENTION

The present invention relates to a cover for preventing chips therein from scattering. The cover is used for a trimmer having a rod at a front end of which a cutter rotating with a high speed is provided to trim grasses or the like.

In general, as trimming or cutting grasses, many small stones are existed on ground and therefore the stones and grasses trimmed may scatter toward an operator near cutter cords or the like of the trimmer. A protection cover is thus provided with a rod of the trimmer to prevent the chips such as small stones and grasses from scattering toward the operator.

In a prior art of a protection cover of the trimmer, a construction shown in JP-B 2-46653(Utility Model) is proposed. That is, as shown in FIG. 17, a trimmer head 43 rotating cutter cords 42 is disposed at a front end of an operational rod 41 and a protection cover 44 for preventing chips such as stones and grasses from scattering toward the operator is provided at the rear of the trimmer head 43. The protection cover 44 comprises an upper wall plate 45 positioned off to the upper of the trimmer head 43 and a protection plate 46 formed integrally to a rear end of the upper wall plate 45. A lower end 46a of the protection plate 46 is elastic and it is set at a position at which the lower end 46a is positioned closest to ground in accordance with the average height of both sexes. When grass trimming is operated as swinging the rod 41 right and left (in a direction shown by an arrow 47 in FIG. 17), the lower end 46a of the protection plate 46 may catch in or interfere with a projection such as a stubble or a large stone. In such a case, the lower end 46a of the protection plate 46 deforms to go over the projection.

The protection cover 44, however, has a problem shown below because the lower end 46a of the protection plate 46 is made of a one-piece plate.

When the lower end 46a catches in the projection such as a stubble or a large stone, the lower end 46a of the protection plate 46 is bent as a whole. That is, a part of the lower end 46a not facing the projection is also bent. A clearance between ground and the lower end 46a of the protection plate 46 hence becomes wider. It may occur that chips such as grasses trimmed or small stones inside the protection cover 44 are scattered toward the operator through the clearance. Operational efficiency of grass trimming by the trimmer with the conventional protection cover thereby is poor or not good due to the scattered grasses and small stones or the like.

Furthermore, the lower end 46a of the protection plate 46 gathers grasses trimmed and small stones on ground inside of the protection plate 46 when the rod 41 is swung right and left. The rotating cutter cords 42 hit the grasses and small stones gathered so that the number of the chips scattering and passing through the clearance between the lower end 46a of the protection plate 46 and the ground increases. Operational efficiency of grass trimming by the trimmer with the conventional protection cover thereby becomes worse.

There is a problem shown below in the conventional protection cover 44 because it can not adjust a vertical position of the protection plate.

Many of the grass trimming operations in a farm village are performed by women whereas many of the grass trimming operations in river side, road side or park are performed by men. In such a situation, a difference in height between men and women is big even in average thereof. It appears that the difference causes trouble in decreasing the effect of the protection cover. That is, the protection plate 46 is mounted at a position at which the lower end 46a is closest to the ground in reference to the average height of the both sexes. Therefore, the clearance between the lower end 46a of the protection plate 46 and the ground becomes wider in a case where person who is taller than the average. The chips scattered hence pass through the clearance and reach the operator. There is thus a problem of low operational efficiency in grass trimming.

To the contrary, in a case where person who is shorter than the average employs the trimmer, the lower end 46a of the protection plate 46 rubs on the ground to increase operational resistance so that the operational efficiency becomes worse and the operator gets more tired.

SUMMARY OF THE INVENTION

The present invention is realized to solve at least one of the above problems and an object of the invention is to improve the operational efficiency of grass trimming or cutting.

In a first aspect of the present invention, it is a gist that a protection cover for preventing chips therein from scattering, the cover is used for a trimmer having a rod at a front end of which a rotating cutter is provided, the protection cover comprising: a wall portion disposed by the cutter; and a protection portion disposed at the rear of the cutter for preventing the chips from scattering rearward by rotational force of the cutter, wherein the protection portion comprises plural elastic members.

According to the first aspect of the invention, the protection portion comprises plural elastic members and hence the members can deform independently. Only one or ones of the members facing the projection on ground deform and the remainders do not deform. Therefore, the clearance between the protection portion and the ground can be prevented from increasing so that the chips inside the protection portion can be prevented steadily from scattering toward the operator through the clearance. The operational efficiency thereby improves.

In the first aspect of the invention, it is preferred to arrange the elastic members with substantial no gap to catch the chips securely.

It is also preferred that the protection portion is configured as a tuft with the elastic members. Such the protection portion can trace the projection on ground so that the protection portion is not caught or not turned up by the projection. The operational efficiency hence becomes better. Furthermore, operational or handling resistance decreases to suppress the operator's tiredness.

It is preferred that the elastic members are shaped as a sheet. The chips scattered hardly get tangled in the protection portion. Therefore, the protection portion catches the chips more securely.

It is preferred that the protection portion are divided into plural regions by slits therein to form the elastic members. The protection portion constructed as mentioned above realizes easy manufacturing.

In a second aspect of the present invention, it is a gist that a protection cover for preventing chips therein from scattering, the cover is used for a trimmer having a rod at a front end of which a rotating cutter is provided, the protection cover comprising: a wall portion disposed by the cutter;

a protection portion connected to the wall portion for preventing the chips from scattering rearward by rotational force of the cutter; and position adjusting means for adjusting a position of the protection portion vertically.

According to the second aspect of the invention, the vertical position of the protection portion is easily adjusted so that it is prevented that the clearance between the protection portion and the ground becomes wider in spite of the difference in height of the operators. Therefore, the chips inside the protection portion can be prevented steadily from scattering toward the operator through the clearance. The operational efficiency thereby improves.

It is preferred in the second aspect that the position adjusting means comprises a connection portion attached to the protection portion and a supporting member connected to the connection portion for supporting a vertical position of the protection portion at a predetermined position. The vertical position of the protection portion is hence adjusted with a simple structure to prevent volume and manufacturing costs of the protection cover from being larger.

The connection portion may comprise a prolonged hole to minutely adjust the vertical position of the protection portion.

It is also preferred that the position adjusting means mentioned above comprises a retaining member attached to the wall portion, a shaft for rotatably retaining the retaining member with respect to the rod, and an angle keeping member for keeping the wall portion at a predetermined connecting angle with respect to the rod. The vertical position of the protection portion is hence adjusted by a simple structure due to varying an angle of the wall portion. The angle is varied in stepwise or in continuous to minutely adjust the vertical position of the protection portion.

The protection portion may have a margin at an upper end thereof to allow the protection portion to shift vertically. When a lower end of the protection portion wears out, the protection portion is shifted downward to keep the clearance between the lower end and the ground constant. Furthermore, the protection portion is economical for a user because the user do not have to substitute new one immediately or always when the lower end of the protection portion wears out.

In a third aspect of the present invention, it is a gist that a protection cover for preventing chips therein from scattering, the cover is used for a trimmer having a rod at a front end of which a rotating cutter is provided, the protection cover comprising: a wall portion disposed by the cutter; a protection portion connected to the wall portion for preventing the chips from scattering rearward by rotational force of the cutter; and angle adjusting means for adjusting an angle of the wall portion.

According to the third aspect of the invention, an angle of the wall portion is adjusted so as to fit the wall portion to the operator's own use. The operational efficiency thereby improves.

It is preferred to construct the angle adjusting means with a simple structure that the angle adjusting means comprises a retaining member attached to the wall portion, a shaft for rotatably retaining the retaining member with respect to the rod, and an angle keeping member for keeping the wall portion at a predetermined connecting angle with respect to the rod. The angle adjusting means can adjust the angle of the wall portion with respect to the rod in stepwise or in continuous to minutely adjust the angle of the wall portion.

BRIEF DESCRIPTION OF THE DRAWINGS

These and other objects and technical advantages of the present invention will be readily apparent from the following description of the preferred exemplary embodiments of the invention in conjunction with the accompanying drawings, in which:

FIGS. 15A to 15C are plane views showing protection covers of other embodiments of the invention.

DETAILED DESCRIPTION OF THE PREFERRED EMBODIMENTS

Embodiments of the present invention will be described hereafter with reference to the drawings.

Figure 1:
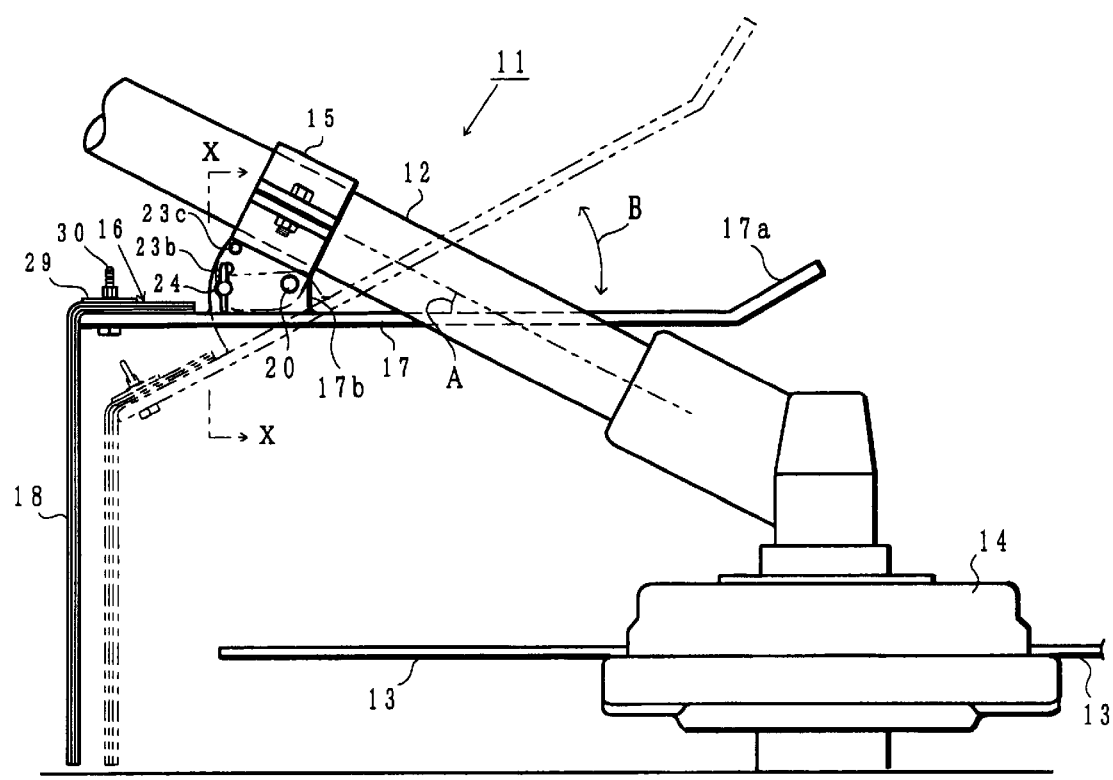
FIG. 1 is a side view of a protection cover of an embodiment of the invention.
Figure 2:
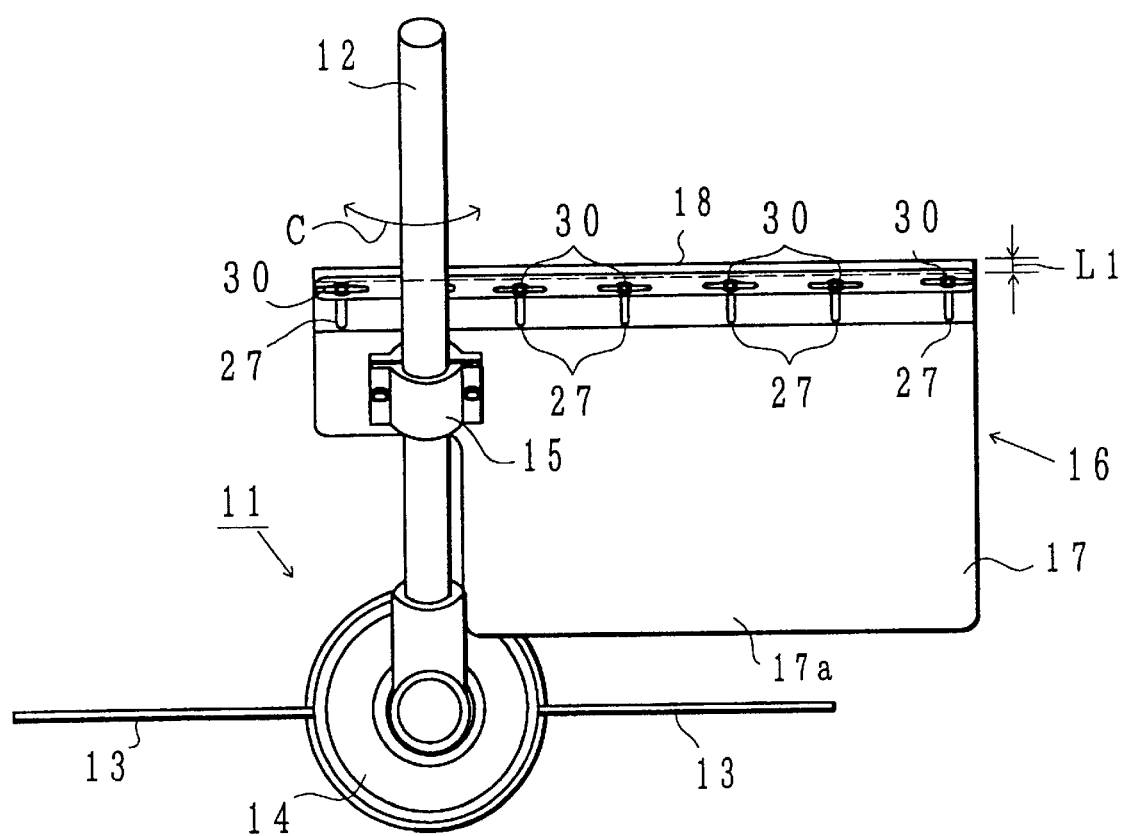
FIG. 2 is a plane view of the protection cover of the embodiment.

As shown in FIG. 1, a trimmer head 14 is disposed at a front end (a right end in FIG. 1) of an operational rod 12 of a trimmer 11. The trimmer head 14 has elastic cutter cords 13 (trimmer cords). The cutter cords 13 are rotated counterclockwise as shown in FIG. 2 by a drive motor not shown. A protection cover 16 is disposed at the rear of the trimmer head 14 on the rod 12 by means of a bracket 15. The protection cover 16 comprises an upper wall plate 17 as a wall portion positioned off to the upper to the trimmer head 14 and a protection portion 18 formed at a rear end of the upper wall plate 17.

Figure 3:
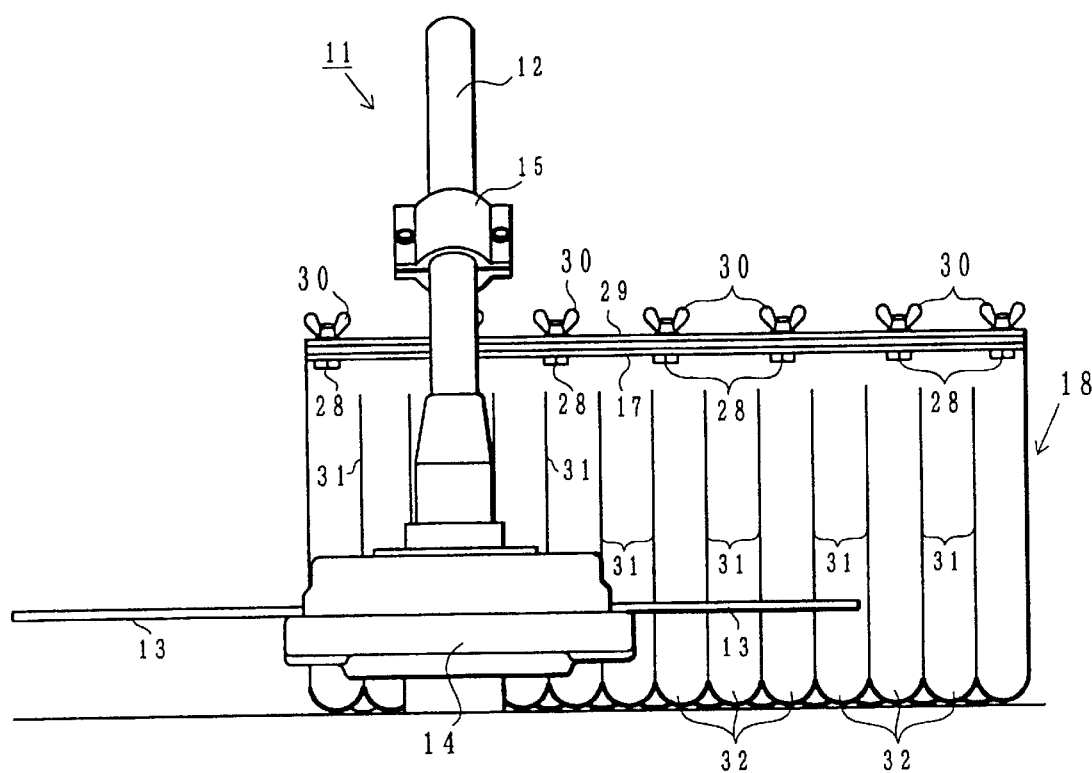
FIG. 3 is a front view of the protection cover of the embodiment.

The upper wall plate 17 comprises transparent resin and the plate 17 has a pair of retaining pieces 17b on an upper surface thereof as shown in FIGS. 1 to 3. A lower portion of the bracket 15 is inserted between the retaining pieces 17b. A rotatable shaft 20 is inserted from right to left (i.e. in a perpendicular direction to the sheet of FIG. 1) at a front end of the retaining pieces 17b and at the under portion of the bracket 15. The upper wall plate 17 rotates forward and rearward (in a direction shown by an arrow B in FIG. 1) around the rotatable shaft 20. An inclination portion 17a inclined upward is formed integrally from an front end of the upper wall portion 17. The trimmer 11 of the present embodiment rotates the cutter cords 13 counterclockwise as looking at the trimmer head 14 downward. The upper wall portion 17 thereby disposed on a left side of the operational rod 12 from a view point of an operator 21 (i.e. on a right side in FIG. 2).

At least one retaining piece 17b is enough to function the above mentioned embodiment. The bracket 15 and the retaining pieces 17b of the embodiment are connected in rotatable under the operational rods 12. The connecting location thereof is arranged freely, e.g. on a side of the rods 12.

Figure 6:
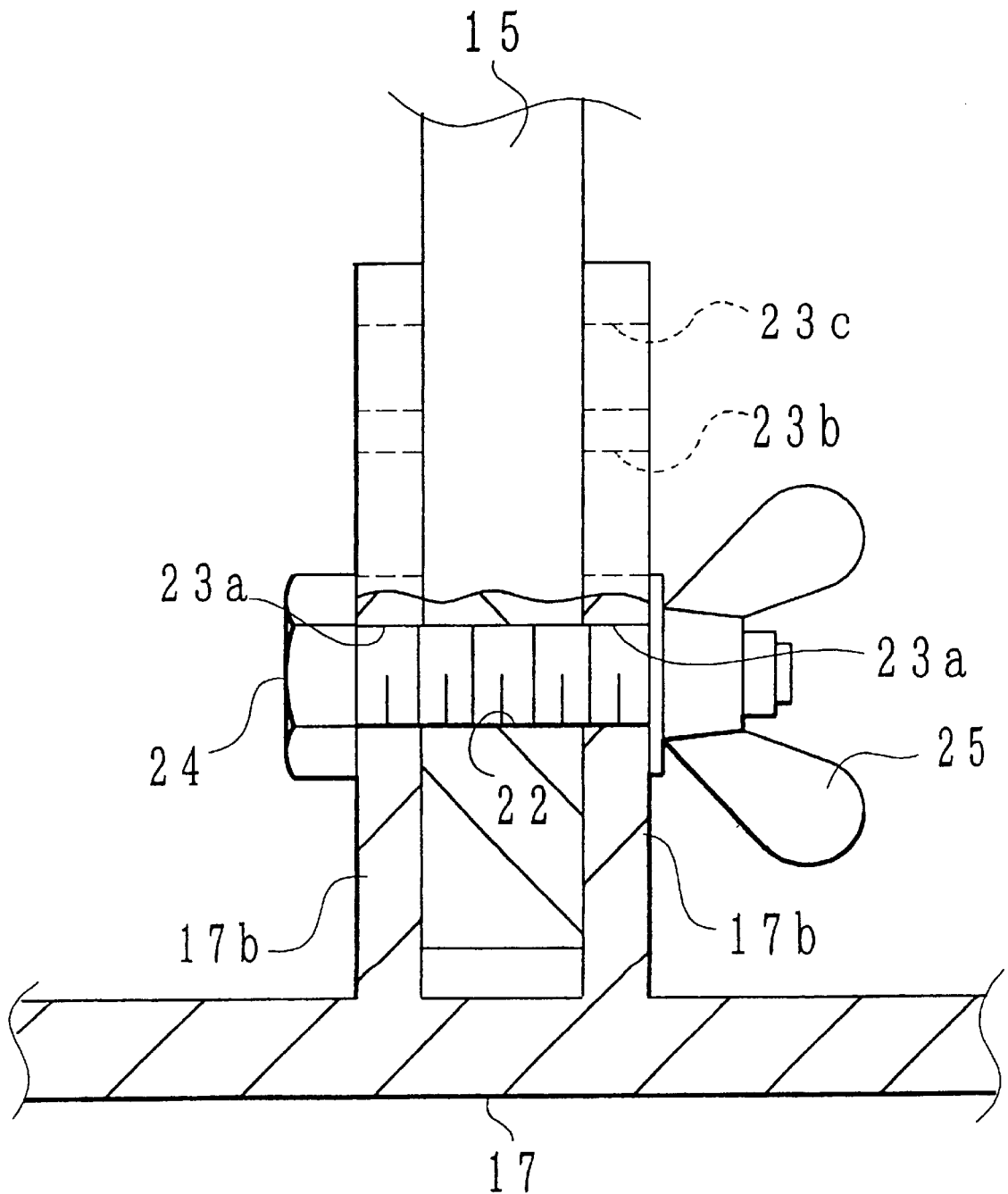
FIG. 6 is a sectional view of the protection cover of the embodiment taken on a line X—X shown in FIG. 1.

As shown in FIG. 1 and FIG. 6, an insert hole 22 is formed at a rear and lower end of the bracket 15. Plural angle adjusting holes 23a to 23c (three in the present embodiment) are formed at a rear end of the retaining pieces 17b as an angle adjusting member. The angle adjusting holes 23a to 23c are disposed with even intervals. A retaining bolt 24 is inserted into the insert hole 22 and one of the angle adjusting holes 23a to 23c (the lowest one 23a is selected in the present embodiment) and a fastening nut 25 is fitted at a free end of the retaining bolt 24. The upper wall plate 17 of the protection cover 16 is kept at a desirable connecting angle A with respect to an axis of the operational rod 12 by screwing the nut 25 to the bolt 24. An angle keeping member is comprised of the retaining bolt 24 and the fastening nut 25.

The connecting angle A of the upper wall plate 17 with respect to the operational rod 12 is variable by substituting one of the angle adjusting holes 23b and 23c to which the retaining bolt 24 is inserted. That is, the connecting angle A of the upper wall plate 17 is adjusted in stepwise (in three steps) in the present embodiment. Position adjusting means and angle adjusting means set forth in claims are comprised of retaining pieces 17b as a retaining member, the rotatable shaft 20, the retaining bolt 24 and fastening nut 25 for the angle keeping member.

Figure 4:
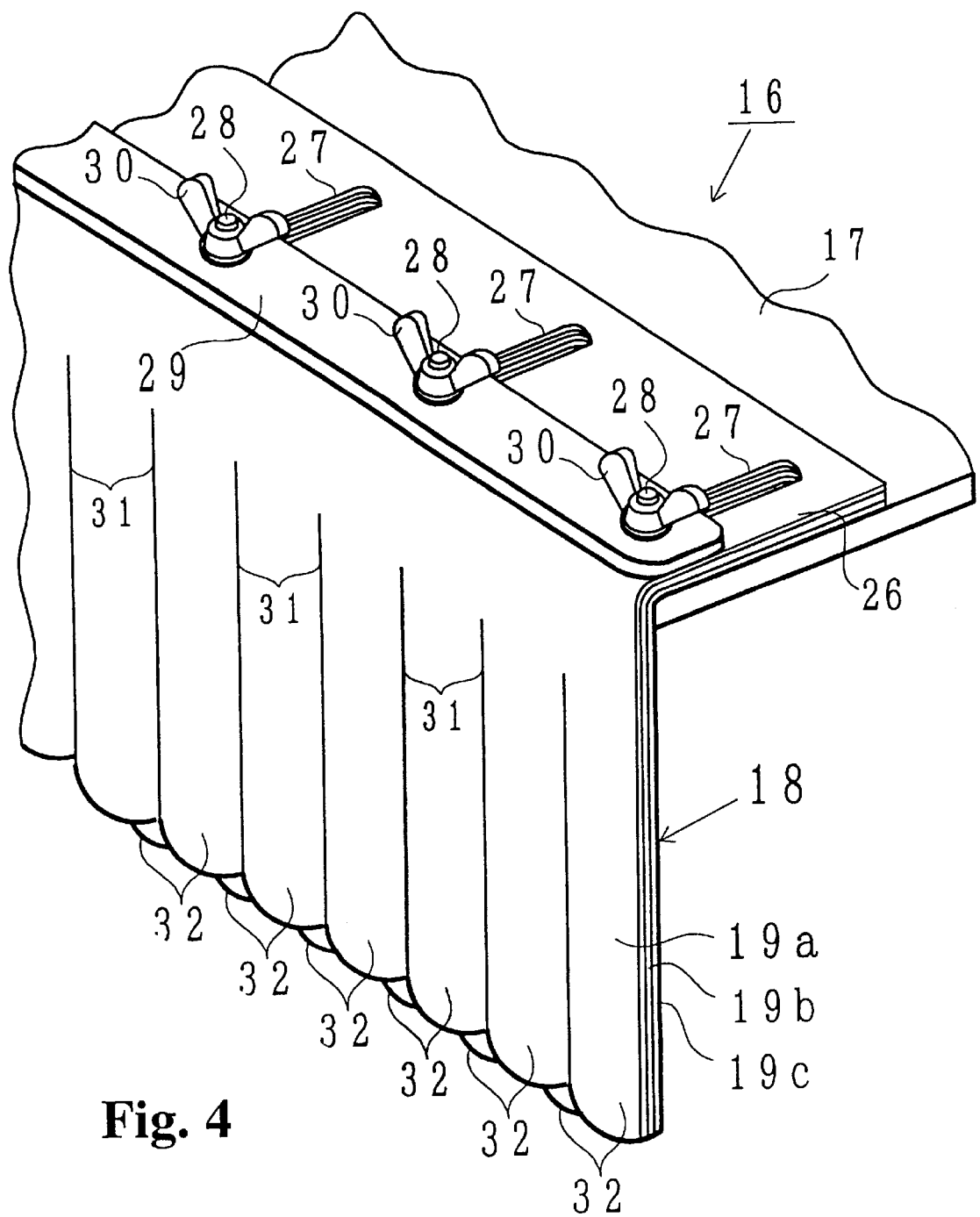
FIG. 4 is a perspective view of a protection cover of the embodiment.
Figure 5:
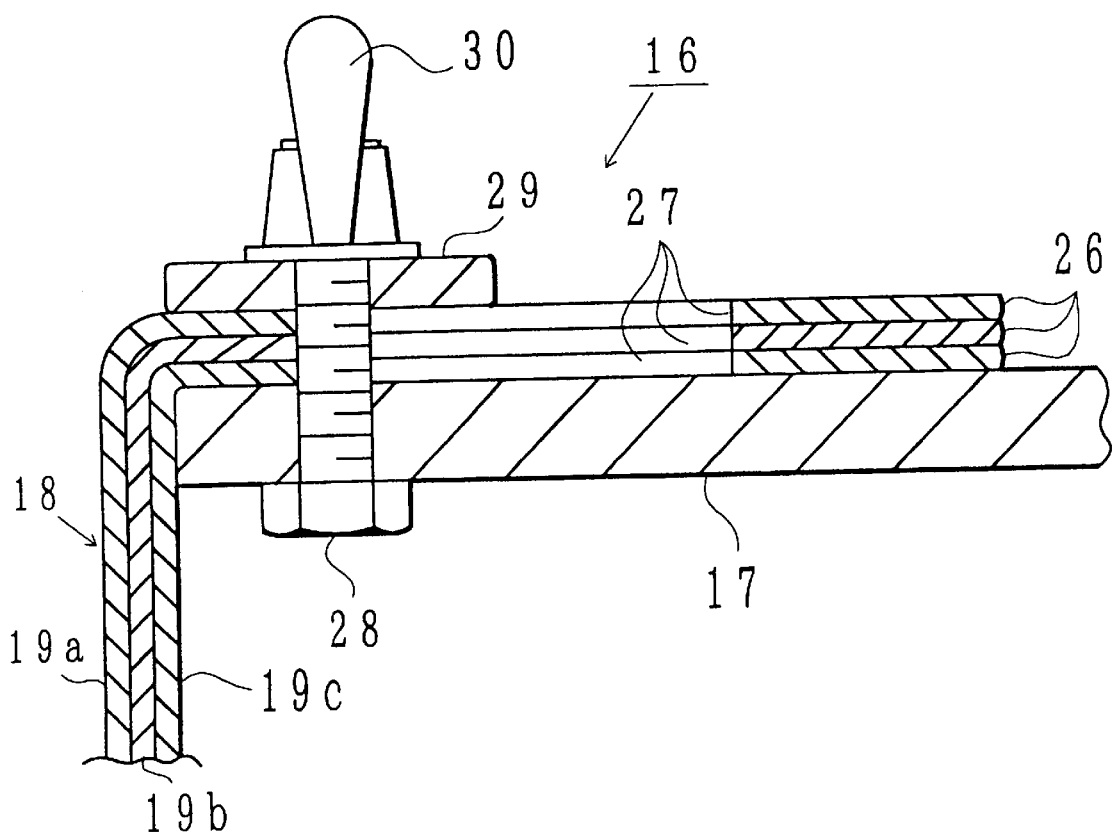
FIG. 5 is a sectional view of the protection cover of the embodiment.

As shown in FIG. 4 and FIG. 5, a protection portion 18 comprises three protection sheets 19a to 19c made of transparent resin. Upper ends of the respective protection sheets 19a to 19c are margin portions 26 and in which plural prolonged holes 27 as a connection portion are formed. The prolonged holes 27 of the respective protection sheets 19a to 19c prolong forward and rearward, i.e. in a longitudinal direction of the elastic pieces 32.

Plural connecting bolts 28 are inserted through a rear end of the upper wall plate 17 and the prolonged holes 27 of the protection sheets 19a to 19c. Fastening nuts 30 are screwed with free ends of the connecting bolts 28, respectively. A sheet fastening plate 29 to which the bolts 28 are freely inserted is interposed between the nuts 30 and the margin portions 26. A connection member is comprised of the connecting bolt 28 and fastening nut 30.

Vertical positions of the respective protection sheets 19a to 19c are maintained at the predetermined position by fastening the nuts 30. The vertical positions of the respective protection sheets 19a to 19c are adjusted by shifting relative positions of the protection sheets 19a to 19c into which the connecting bolts 28 are inserted. Top ends of the respective protection sheets 19a to 19c slides in accordance with the adjustment of the vertical position. Position adjusting means set forth in claims is comprised of at least one of the prolonged holes 27, connecting bolt 28 and fastening nut 30 for a supporting member.

As shown in FIG. 4 and FIG. 5, the three protection sheets 19a to 19c are piled to each other and the top ends of the respective protection sheets 19a to 19c are suspended from the rear end of the upper wall plate 17. The protection sheets 19a to 19c have plural slits 31 and the sheets are constructed by plural elastic pieces (elastic member) 32 divided by the slits 31. Each of the elastic pieces 32 is shaped to a sheet. That is, the protection portion 18 comprises plural elastic pieces 32 of 35 mm width. Each of the slits 31 is vertically formed in parallel with even intervals in the right and left direction from a lower end of each of the protection sheets 19a to 19c to a position corresponding to the rear end of the upper wall plate 17. That is, in the protection sheets 19a to 19c, elastic pieces 32 positioned side by side have the same width in the right and left direction and same thickness, and further the same length in the vertical direction. Each of the elastic pieces 32 of the protection sheets 19a to 19c deform and bend freely. Side edges of the elastic pieces 32 positioned side by side contact to each other.

Slits 31 of the respective protection sheets 19a to 19c are not formed in series in a forward and rearward direction. Therefore, elastic pieces 32 of the protection sheets 19a to 19c are piled each other but displacing centers thereof in the forward and rearward direction. The protection portion 18 is configured to a tuft as a whole by the elastic pieces 32 of the protection sheets 19a to 19c.

Description to the protection cover 16 of the trimmer 11 constructed as mentioned above will be made hereafter. The retaining bolt 24 is inserted into the lowest angle adjusting hole 23a before grass trimming operation. Connecting bolts 28 are inserted into the rear end of the prolonged holes 27 of the protection sheets 19a to 19c and fastened by the nuts 30.

When an operator grasps the operational rod 12 and swings it right and left (in a direction shown by an arrow C in FIG. 2) as rotating the cutter cords 13, grasses are cut and trimmed by the rotational force of the cutter cords 13. Some grasses trimmed are scattered toward the operator. They, however, lash against the protection sheets 19a to 19c of the protection portion 18 to avoid reaching the operator. In a grass trimming operation, in a case where there is a projection such as a stubble or a large stone on ground to be trimmed, only one or ones of the elastic pieces 32 which face the projection are bent. That is, a clearance between the ground and the protection sheets 19a to 19c does not become wide because lower ends of the protection sheets do not bend as a whole. Furthermore, the protection portion 18 is configured not to a plate but to a tuft a whole so that the protection portion 18 functions as a cushion. If the hard chips such as a small stone lashes against the protection sheets 19a to 19c, a reflection distance thereof is suppressed due to the cushion.

In a case where a vertical length of the protection portion 18 shortens because the protection sheets 19a to 19c wears out due to friction against the ground or the like, an connecting angle A of the upper wall plate 17 should be changed. That is, the retaining bolt 24 is released from the angle adjusting hole 23a of the retaining pieces 17b and insert hole 22 of the bracket 15 after loosening the nut 25. The upper wall plate 17 is rotated around the shaft 20 to displace the lowest angle adjusting hole 23a from the insert hole 22 of the bracket 15. The middle adjusting hole 23b or upper most adjusting hole 23c is faced to the insert hole 22 in response to an amount of wear of the protection portion 18. For example, where the middle angle adjusting hole 23b is faced to the insert hole 22, the retaining bolt 24 released beforehand is inserted into the both holes 22 and 23b. Thereafter, the butterfly nut 25 is screwed to the free end of the retaining bolt 24 and fastened thereto. Accordingly as shown by a chine line with double dots in FIG. 1, as the connecting angle A becomes large and the upper wall plate 17 inclines rearward, the protection portion 18 falls down to have the lower ends of the protection sheets 19a to 19c close to the ground.

If the lower ends of the protection sheets 19a to 19c fail to be close enough to the ground by changing the connecting angle A of the upper wall plate 17 in a manner mentioned above, the protection sheets 19a to 19c are shifted vertically. That is, the fastening nuts 30 are loosen from the connecting bolts 28 to release support for the protection sheets 19a to 19c and have them be free, i.e. a condition enabling to adjust vertical positions thereof. Thereafter, the protection sheets 19a to 19c are displaced downward in correspondence with a wear length of the protection portion 18. That is, relative positions of the connecting bolts 28 are shifted right in the prolonged holes 27 of the protection sheets 19a to 19c. After that, the protection sheets 19a to 19c are kept at a desirable position by fastening the nuts 30.

The clearance between the lower end of the protection sheets 19a to 19c and the ground becomes wider when person who is taller in height than the average user of the trimmer 11. In such a situation, the connecting angle A of the upper wall plate 17 is adjusted to a larger angle or the position of the protection sheets 19a to 19c are shifted downward in the manner mentioned above to cope with the situation. The clearance between the lower end of the protection portion 18 and the ground thereby does not become wide. To the contrary, when person who is shorter in height than the average user of the trimmer 11, the lower end of the protection sheets 19a to 19c rub against the ground. In such a situation, the connecting angle A of the upper wall plate 17 is adjusted to a smaller angle or the position of the protection sheets 19a to 19c are shifted upward to cope with the situation.

The protection cover 16 of the present embodiment results in at least one of the following technical advantages.

(1) When the protection sheets 19a to 19c interferes with the projection such as the large stone or the stubble, one or more of elastic pieces 32 facing the projection is bent and the remainder of the elastic pieces 32 is not bent. The clearance between the protection sheets 19a to 19c and the ground is thus kept constant and does not increase. Therefore, it is securely prevent that the chips such as grasses trimmed or small stones scatter towards the operator through the clearance. The operational efficiency of grass trimming thereby improves.

(2) The protection portion 18 is constructed to a tuft by the plural elastic pieces 32 so that the elastic pieces 32 of the protection sheets 19a to 19c elastically bend as the operational rod 12 is swung right and left. Few grasses and small stones are thus gathered by the protection portion 18 to be heaped up inside the protection sheets 19a to 19c. Therefore, the cutter cords 13 rotating inside of the protection sheets 19a to 19c hardly hit the chips such as the grasses and small stones so that the number of the chips scattering and passing through the clearance decreases remarkably. Operational efficiency of grass trimming by the trimmer with the present embodiment thereby improves.

(3) The connecting angle A of the upper wall plate 17 is variable by replacing the position of the retaining bolt 24. Furthermore, positions of the connecting bolts 28 with respect to prolonged holes 27 of the protection sheets 19a to 19c are also variable. Therefore, the vertical positions of the protection sheets 19a to 19c are variable. That is, the vertical positions of the protection sheets 19a to 19c are set easily at the position most suitable for the operator. It can be thus prevented that the clearance between the protection sheets 19a to 19c and the ground becomes wider in spite of the dispersion in height of the operator. The chips are thus prevented securely from scattering toward the operator so that the operational efficiency of grass trimming improves and the operator's tiredness is suppressed. If the situation that the lower end of the protection portion 18 shortens due to wears, tears or breaks, it can easily cope with the situation by adjusting the vertical position of the protection sheet 19a to 19c to the desirable position.

(4) The protection portion 18 is formed along a straight line in the right and left direction. Such a protection portion 18 is distinguished as follows from a type shown in FIG. 7 in which a protection portion 18 is connected to a rear end of upper wall plate 33 arched. That is, a length L1 (shown in FIG. 2) between a front surface and rear surface of hung down portion of the protection portion 18 on the straight line is shorter than a length L2 (shown in FIG. 7) of the protection portion 18 on an arched line. The longer the length of the protection portion 18, the larger the operational resistance as swinging the operational rod 12 right and left. According to the protection cover shown in FIG. 2, the operational efficiency of grass trimming thus improves and the tiredness of the operator is also suppressed.

Figure 7:
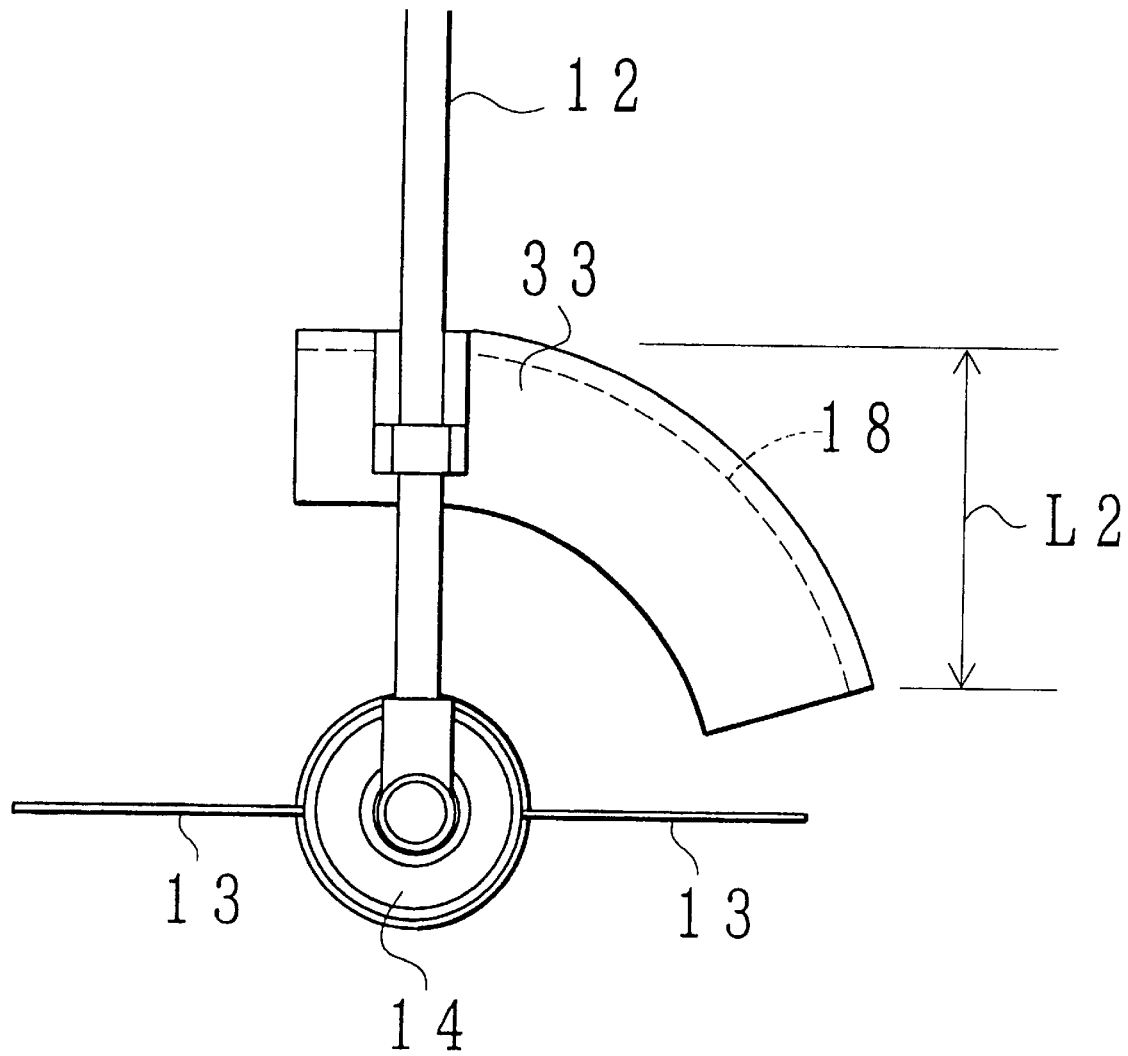
FIG. 7 is a plane view of a protection cover of another embodiment of the invention.

(5) Constitution of the upper wall plate 17 shown in FIG. 2 is more simple than that of the upper wall plate 33 arched shown in FIG. 7 so that a cost of a mold for the upper wall plate 17 decreases and such the upper wall plate 17 is suitable in molding.

(6) The upper ends of the protection sheets 19a to 19c are formed as the margins 26 so that the margins 26 cope with variation of the clearance between the lower end of the protection sheets 19a to 19c and the ground. It is thereby prevented securely that the chips scatter and reach the operator through the clearance. Furthermore, when the lower end of the protection sheets 19a to 19c shorten due to wears and breaks or the like, the user does not have to substitute new one immediately and it is economical for the user.

(7) Prolonged holes 27 are formed at the margins 26 of the protection sheets 19a to 19c and the connecting bolts 28 to be fastened by the nuts 30 are inserted into the respective prolonged holes 27. The relative positions of the connecting bolts 28 with respect to the prolonged holes 27 can be varied not in stepwise but in continuous. The vertical positions of the protection sheets 19a to 19c are thus adjusted minutely.

The present invention may be constructed as shown below rather than the above mentioned embodiment.

(a) The protection cover 16 is disposed with the trimmer 11 having elastic cutter cords 13 in the above mentioned embodiment. The protection cover 16 may be disposed with another type of trimmer which has a hard cord such as piano wire or a chain or which has a blade.

(b) In the embodiment, the elastic pieces 32 are elastic as a whole. Each of the elastic pieces 32 may have an elastic part therein, e.g. each lower end of the elastic pieces is elastic and each the remainder part of the elastic pieces is made of non-elastic material.

Figure 8:
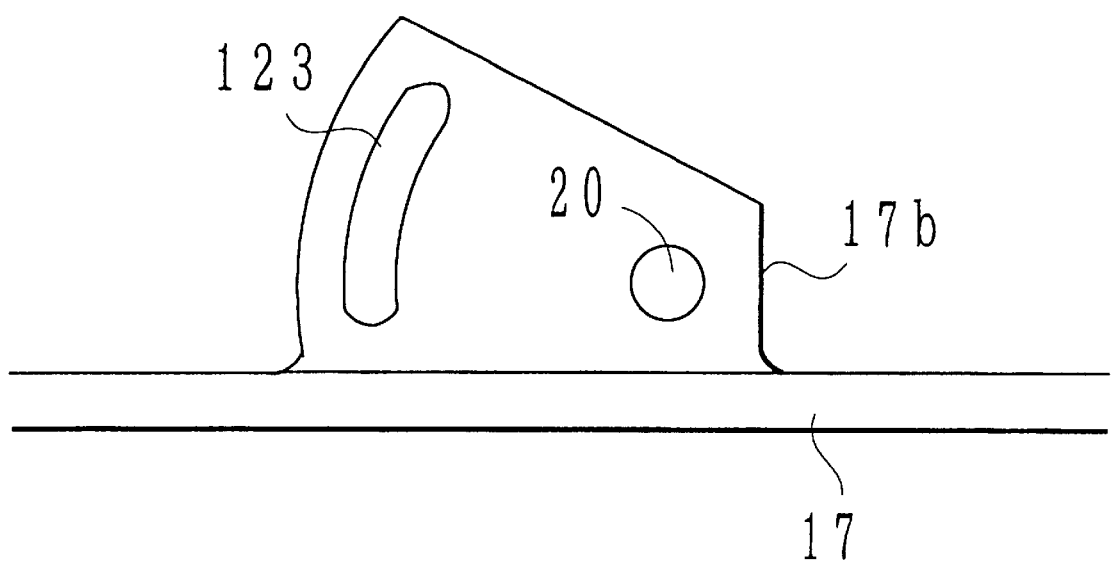
FIG. 8 is a sectional view of a protection sheets of another embodiment of the invention.

It is preferred that at least a part of the elastic piece 32 facing the cutter cords 13 is made of hard material such as reinforced resin to guard the elastic piece 32 from wearing or breaking by interference of the cutter cords 13. FIG. 8 shows the reinforced piece 190 which is reinforced by fibers such as metal fibers or carbon fibers. The piece 190 may be made of a thin metal plate. Elastic pieces 19a and 19b guarded by the reinforced piece 190 are allowed to be made of material which has not high durability and not expensive. Therefore, the manufacturing cost of the cover is suppressed in total.

Figure 9:
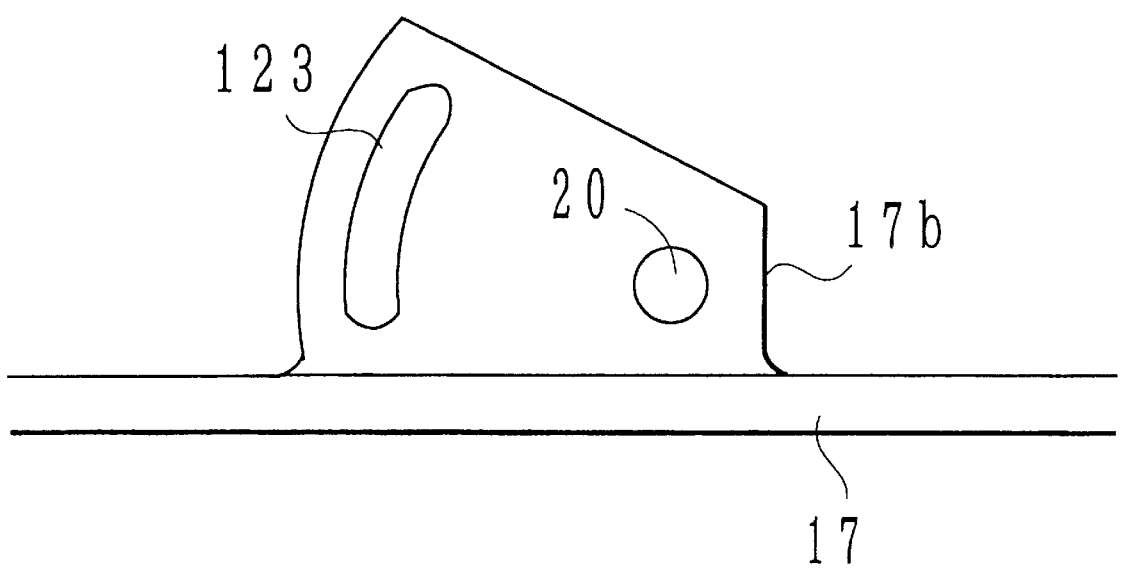
FIG. 9 is a side view of a retaining piece of a protection cover of another embodiment of the invention.
Figure 10:
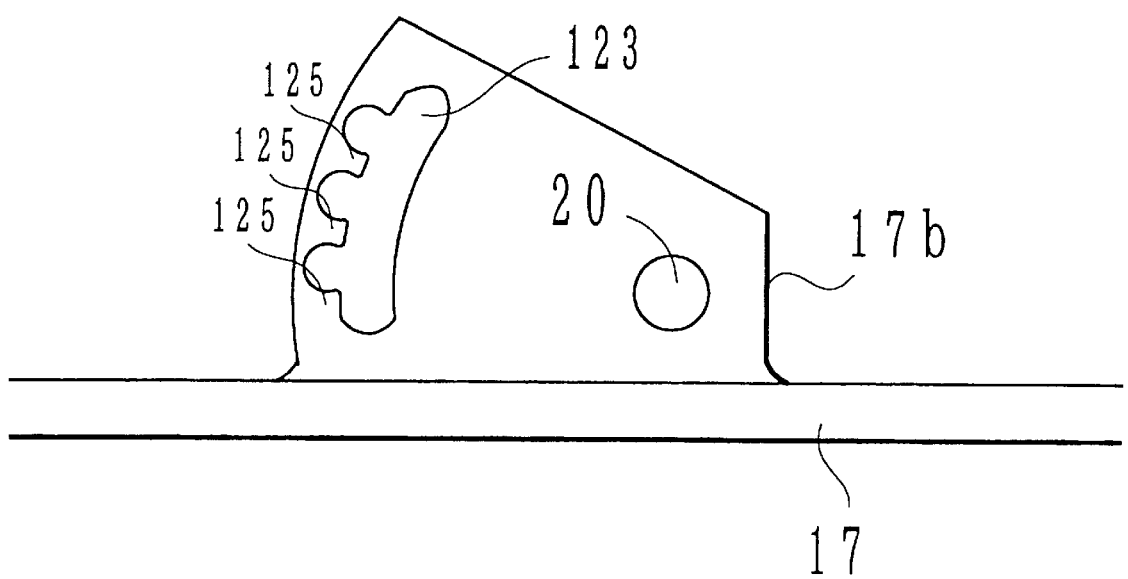
FIG. 10 is a side view of a retaining piece of another embodiment of the invention.

(c) In the embodiment, three angle adjusting holes 23a to 23c are disposed at the rear end of the retaining pieces 17b. The number of the angle adjusting holes is optional but should be one or more. Arched hole 123 along with the rear end of the retaining pieces 17b may be substituted for the angle adjusting holes 23a to 23c as shown in FIG. 9. By using the arched hole 123, the connecting angle A of the upper wall plate 17 with respect to the operational rod 12 may be changed in continuous to adjust it. Furthermore, as shown in FIG. 10, offsets 125 may be formed on a wall of the hole 123 so that the connecting angle A is adjusted in stepwise without releasing the retaining bolt 24. In that case, it is preferred to have the insert hole 22 of the bracket 15 oval to allow the retaining bolt 24 to shift on the offsets 125.

(d) The angle adjusting holes 23a to 23b are disposed at the other position to the rotatable shaft 20. The angle adjusting holes 23a to 23b may be formed at a position facing the shaft 20. In such a configuration, manufacturing cost is suppressed because the retaining bolt 24 and fastening nut 25 can be eliminated.

(e) In the embodiment, three protection sheets 19a to 19c are used but the number of the protection sheet is optional but should be one or more. The protection sheets 19a to 19c are suspended from the rear end of the upper wall plate 17 by connecting bolts 28 and fastening nuts 30. The configuration for suspending the sheets is optional, that is the protection sheets and the upper wall plate may be jointed integrally. An angle between the protection sheets 19a to 19c and the upper wall portion 17 is also optional.

(f) In the embodiment, prolonged holes 27 as connecting portions are formed in the protection sheets 19a to 19c. The following deformation may be substituted for the prolonged holes 27. For example, plural circular holes are linearly arranged in the forward and rearward direction of the trimmer 11 and prolonged holes may be open at the rear end of the protection sheets 19a to 19c.

(g) In the embodiment, the position adjusting means for adjusting vertical position of the protection sheets 19a to 19c comprises retaining pieces 17b, the rotatable shaft 20, retaining bolt 24 and fastening nut 25. The position adjusting means also comprises prolonged holes 27 in the protection sheets 19a to 19c, connecting bolts 28 inserted into the prolonged holes 27 and nuts 30. The retaining pieces 17b of the upper wall plate 17 may be configured so that it can vertically slide. According to the configuration, it is possible to adjust the vertical position of the protection sheets 19a to 19c because the upper wall plate 17 is allowed to move vertically. A prolonged hole or plural circular holes on an imaginary line in the upward and downward direction may be formed at the rear end of the upper wall plate 17 as means for adjusting vertical position of the protection sheets 19a to 19c. The sheet fastening plate 29 may be eliminated.

Figure 11:
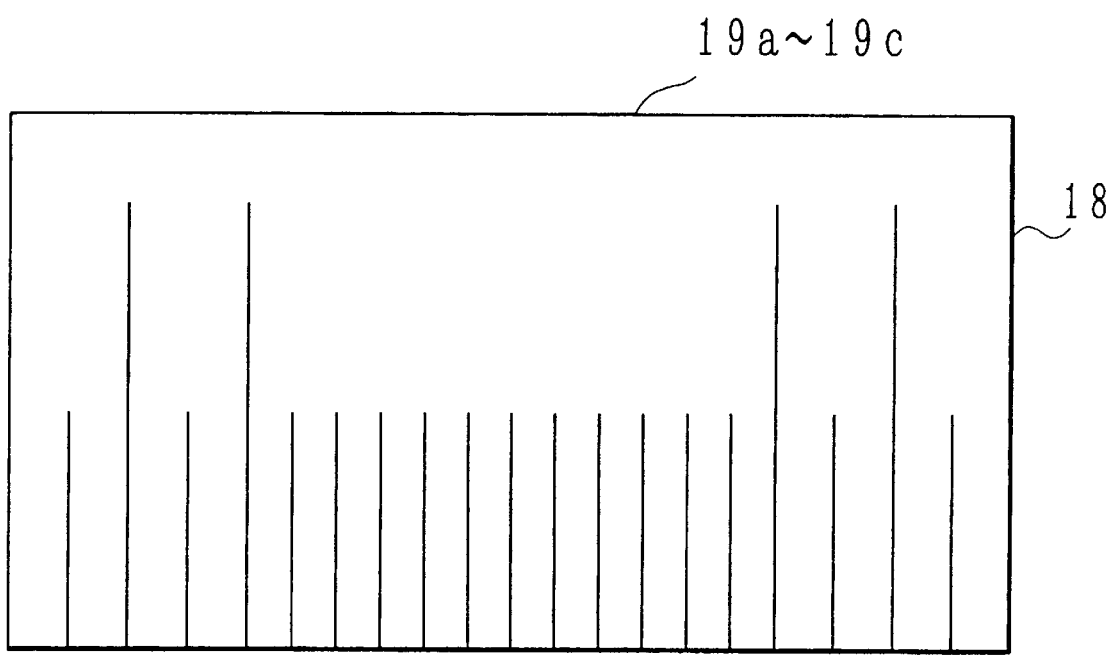
FIG. 11 is a front view of protection sheets of another embodiment of the invention.

(h) In the embodiment, plural slits 31 are formed and the number of the slits is optional but should be one or more. As shown in FIG. 11, length and pitch of the slits are not fixed and they are designed optionally.

(i) In the embodiment, the slits 31 are formed in parallel in the vertical direction. The slits 31 may be deformed as follows. That is, the inclined slits may be formed. The slits may be formed not in parallel. The slits may be formed in radial from the upper end to the lower end of the protection sheets 19a to 19c. The slits may be formed as varying the vertical length thereof in the order of increasing or decreasing from right to left.

Figure 12:
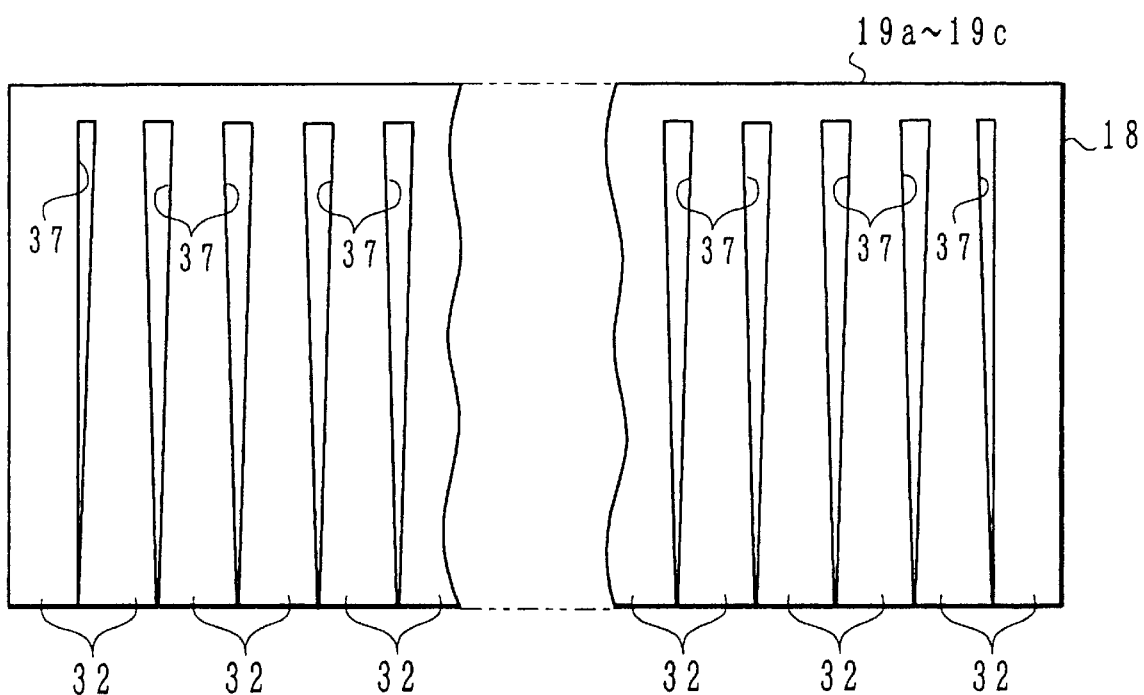
FIG. 12 is a front view of protection sheets of another embodiment of the invention.

(j) In the embodiment, side edges of the elastic pieces 32 positioned side by side contact to each other. The slits 31 may have wider width, that is a cutting-off may be formed between the elastic pieces 32 positioned side by side to form a little gap between the elastic pieces 32 without affecting the function that prevents chips form scattering toward the operator. Factually, as shown in FIG. 12, notches 37 each having an inverse triangular shape are formed and each of the elastic pieces 32 is shaped triangular by the notches 37. A weight of the protection sheets is reduced by means of the notches 37 of inverse triangular shape so that operational efficiency of grass trimming improves.

In the embodiment, the protection sheets 19a to 19c are perpendicular to the operational rod 12 because the protection sheets 19a to 19c are disposed at the rear end of the upper wall plate 17. The upper wall plate 33 having arched shape may be used and at the rear end of which the protection sheets 19a to 19c are disposed. The protection sheets 19a to 19c connected to the arched plate 33 has an arched shape as a whole. The configuration of the rear end of the upper wall plate 33 is not limited to the above and it may be configured freely. The upper wall plate 33 may extend laterally from the operational rod 12 right and left and then the protection sheets 19a to 19c extend downwardly from operational rod 12 right and left.

(l) In the embodiment, the slits 31 of the respective protection sheets 19a to 19c are not formed in series in a forward and rearward direction, i.e. in its thickness direction. Therefore, the elastic pieces 32 of the protection sheets 19a to 19c are piled each other but displacing centers thereof in the forward and rearward direction. As another configuration, the slits of the respective protection sheets 19a to 19b may be formed in series in a forward and rearward direction to have the elastic pieces 32 piled each other while having the centers thereof in file.

Figure 13:
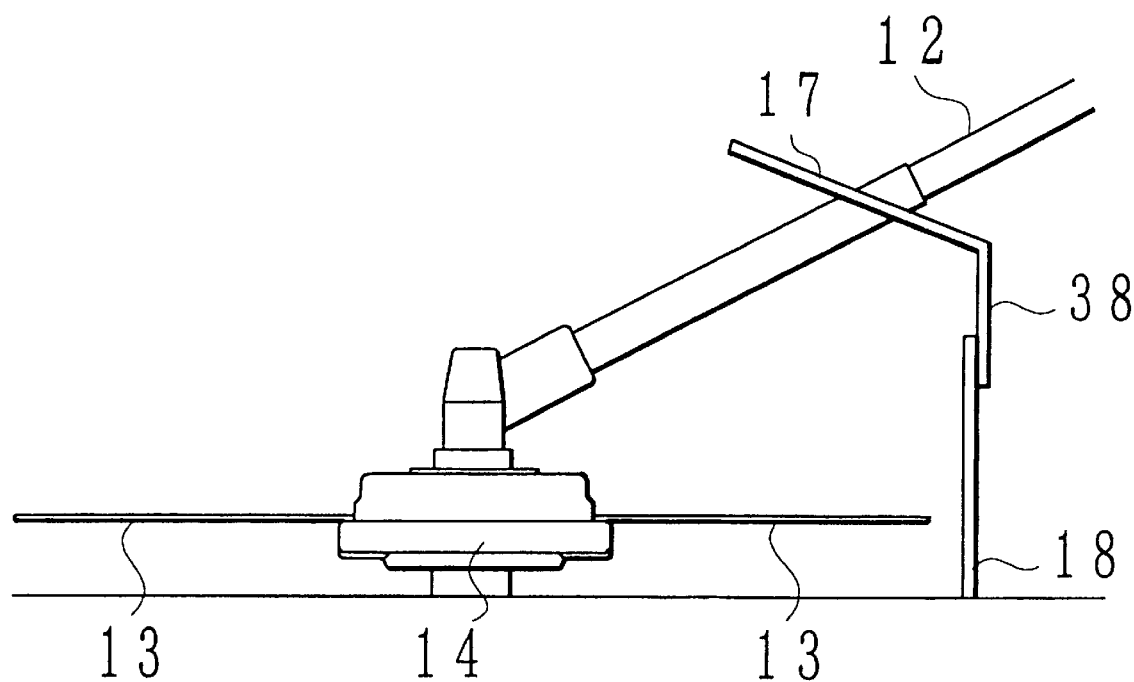
FIG. 13 is a side view of a protection cover of another embodiment of the invention.

(m) In the embodiment, the protection sheets 19a to 19c are suspended from the rear end or the upper wall plate 17. As another configuration, as shown in FIG. 13, the upper wall plate 17 may be inclined rearward and a vertical portion 38 is disposed at the rear end of the upper wall portion 17. The vertical portion 38 extends in a downward plane from the operational rod 12. The protection portion 18 may be attached to the vertical portion 38. According to the configuration shown in FIG. 13, the operator can operate the rod 12 easily so that operational efficiency improves and the tiredness of the operator is suppressed.

Figure 14:
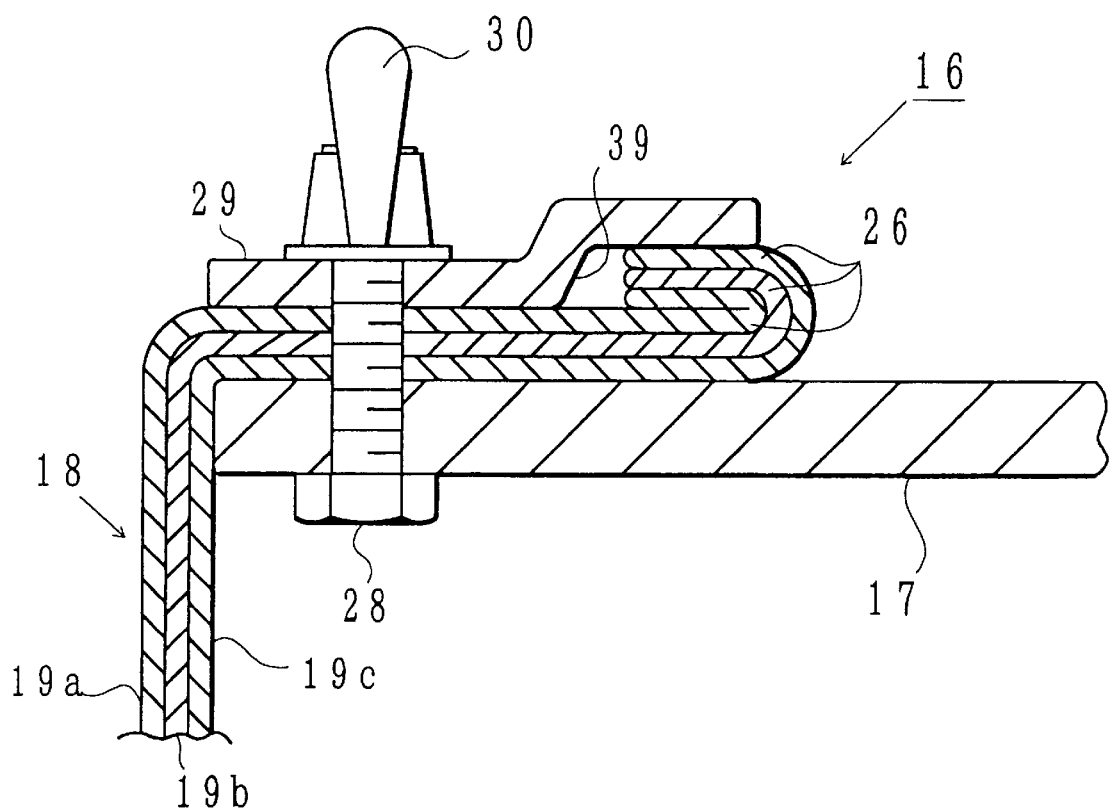
FIG. 14 is a sectional view of an upper portion of a protection cover of another embodiment of the invention.

(n) In the embodiment, the margin portions 26 of the respective protection sheets 19a to 19c are plate-like and not be bent and the margin portions are attached to the upper wall plate 17. As another configuration, as shown in FIG. 14, a step portion 39 is provided with the sheet fastening plate 29. The margin portions 26 may be bent for inserting into the step portion 39 to attach the protection sheet 19a to 19c to the upper wall plate 17.

(o) In the embodiment, the protection sheets 19a to 19c are configured as the tuft by plural elastic pieces 32 each having a rectangular tape shape. At least one of the elastic pieces 32 may be replaced by another elastic liner member such as a rope, a line or a wire to from the tuft. The material of the elastic member 32 is not limited to the resin. A metal sheet, a rubber sheet and a sheet comprises composite material thereof may be substituted for the resin.

(p) In the embodiment, each of the elastic pieces 32 has the same thickness. The thickness of the elastic piece may be thickened in order of leaving the margin portion 26. That is, the center of gravity of the elastic piece shifts downward.

The elastic piece having such configuration suppresses its turn-up and improves its duration.

(q) In the embodiment, the protection portion 18 is configured by piling the three protection sheets 19a to 19c in the forward and rearward direction. Configurations shown in FIGS. 15A to 15C may be used. That is, as shown in FIG. 15A, protection sheets 40 having shorter or narrower width than that of the protection sheets 19a to 19c in the embodiment may be used. The side edges of the respective sheets 40 are contacted to have the sheets 40 be in file. As shown in FIG. 15B, the side edges of the respective sheets 40 may be partially piled up. As shown in FIG. 15C, a step portion 40a is formed on one edge of protection sheet 40 and the other edge of the sheet 40 is partially piled with the step portion 40a of the next sheet 40. According to the configurations shown FIG. 15B and FIG. 15C, if the protection sheets 40 bend as operating grass trimming, the protection sheets 40 do not open or make gaps therebetween. It is therefore prevented securely that grasses or small stones scatters toward the operator. Furthermore, the protection sheets 40 are narrower than the protection sheets 19a to 19c of the embodiment and number of the sheets 40 is reduced so that the protection portion 18 becomes light in weight.

Figures 16, 16A, 16B:
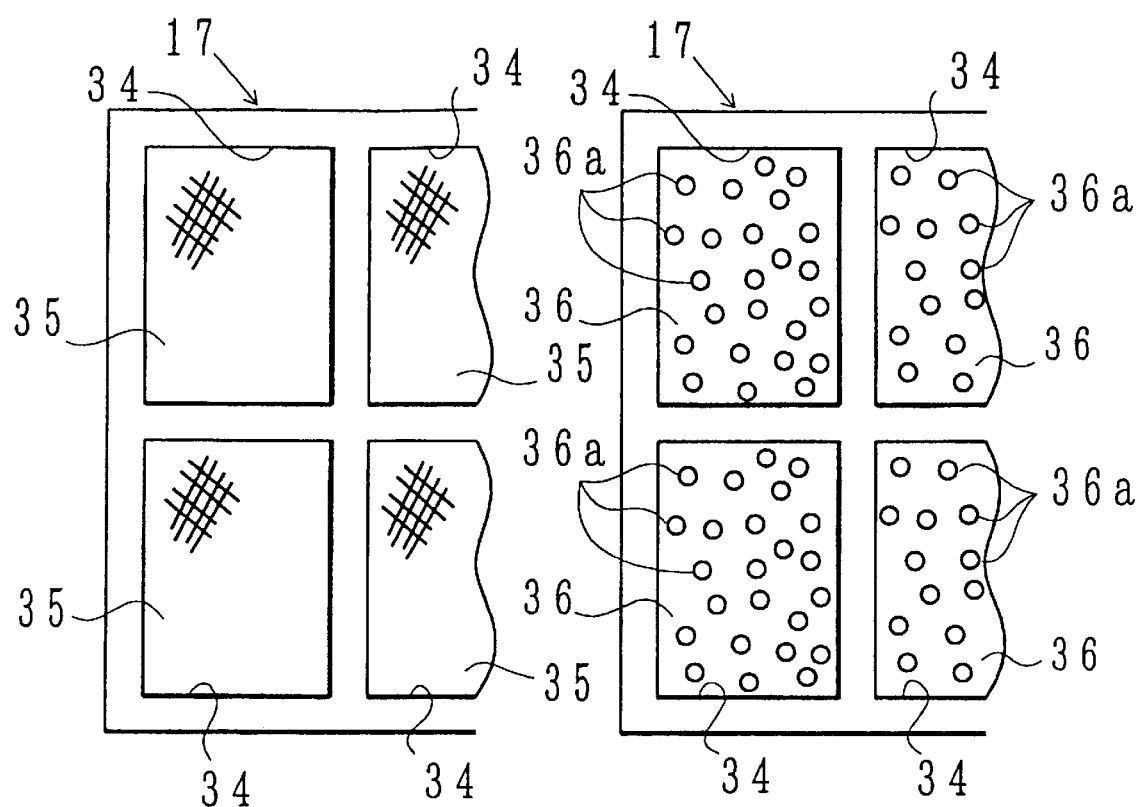
FIGS. 16A and 16B are plane views showing wall portions of other embodiments of the invention.
Figure 17:
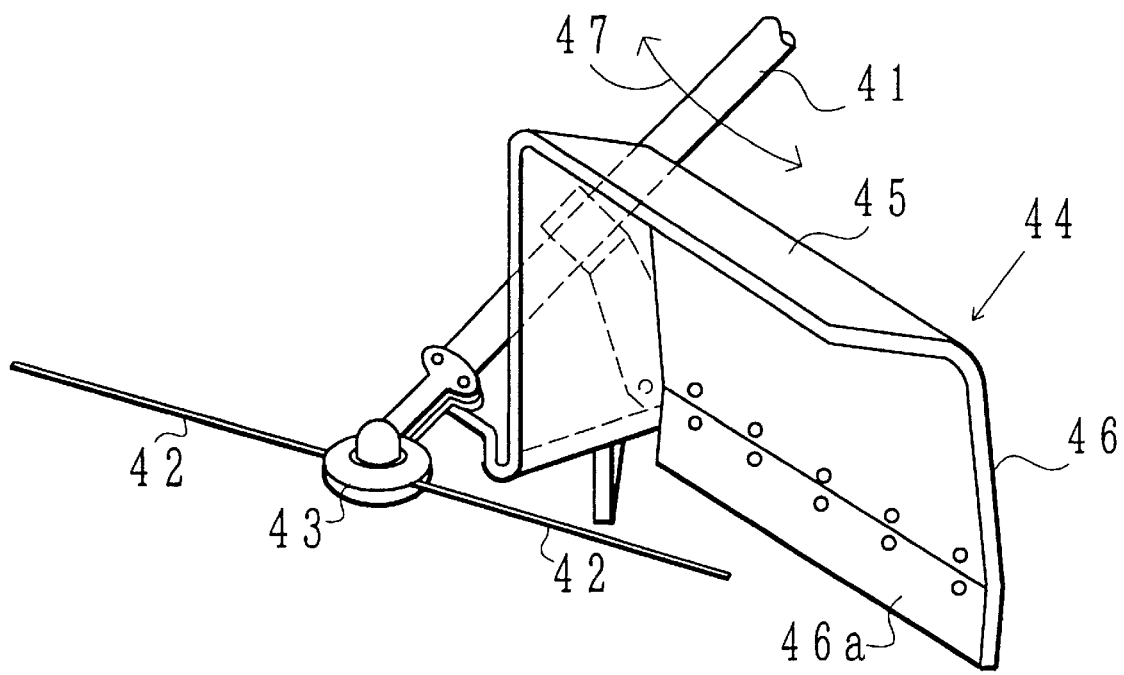
FIG. 17 is a perspective view showing a protection cover of prior art.

(r) The upper wall plate 17 of the embodiment may be deformed as follows. That is, as shown in FIG. 16A, plural windows 34 are made in the upper wall plate 17 and the windows 34 are filled with net members 35. The upper wall portion 17 becomes like a screen by the net member 35. As shown in FIG. 16B, the windows 34 may be filled with panels 36 having many holes 36a rather than net member 35. The upper wall portion 17 becomes a screen formed by the panels 36 having many holes 36a. The holes 36a may be made at the same time of forming the upper wall portion 17 by injection molding rather than attaching the panels 36 as divided members to the upper wall plate 17. According to the configuration shown in FIGS. 16A and 16B, the upper wall plate 17 itself becomes light in weight so that operational efficiency of grass trimming improves. In the above, the screen is meant that the grasses trimmed inside the upper wall plate 17 and the small stones do not pass through whereas keeping ventilation.

The upper wall plate 17 may be made narrower so long as it can support the protection portion 18. The upper wall plate 17 may be constructed with rods or wires. The configuration of the upper wall plate 17 is not limited so long as it can connect the protection portion to the operational rod.

(s) In the embodiment, the width of the each elastic pieces is 35 mm, but the width can range from 20 to 60 mm, a preferable range thereof is 10 to 100 mm and a possible range is 5 to 150 mm.

Invention reduced from the above mentioned will be described hereafter with a technical advantage.

(A) A protection cover for preventing chips therein from scattering, the cover is used for a trimmer having a rod at a front end of which a rotating cutter is provided, the protection cover comprising: a wall portion disposed by the cutter; and a protection portion disposed at the rear of the cutter for preventing the chips from scattering rearward by rotational force of the cutter, wherein the wall portion comprises a screen. According to the invention mentioned above, the wall portion becomes light in weight so that the operational efficiency improves.

(B) A protection cover for the trimmer set forth in (A), wherein said wall portion comprises a net member. According to the configuration, the same technical advantage is carried out.

(C) A protection cover for the trimmer set forth in (A), wherein said wall portion comprises plural holes. According to the configuration, the same technical advantage is carried out.

The present invention has been described in detail, it should be understood that various changes, substitutions and alternations can be made hereto without departing from the spirit and scope of the present invention as defined by the appended claims.

What is claimed is:

1. A protection cover for preventing chips therein from scattering, said cover is used for a trimmer having a rod at a front end of which a rotating cutter is provided, said protection cover comprising:

a wall portion disposed by said cutter; and a protection portion disposed at the rear of said cutter for preventing said chips from scattering rearward by rotational force of said cutter, wherein said protection portion comprises plural elastic members which contact ground.

2. A protection cover for said trimmer according to claim 1, wherein said elastic members are allowed to deform independently.

3. A protection cover for said trimmer according to claim 2, wherein said elastic members are arranged each other with substantial no gap.

4. A protection cover for said trimmer according to claim 1, wherein said protection portion is configured to a tuft with said elastic members.

5. A protection cover for said trimmer according to claim 1, wherein each of said elastic members of said protection portion is shaped to a sheet.

6. A protection cover for said trimmer according to claim 1, wherein said plural elastic members are formed by dividing an elastic sheet by slits.

7. A protection cover for said trimmer according to claim 6, wherein at least one of said slits is formed from a lower end of said elastic sheet not to an upper end of said elastic sheet.

8. A protection cover for said trimmer according to claim 7, wherein said protection portion comprises two or more said elastic sheets.

9. A protection cover as claimed in claim 1 for preventing chips therein from scattering, said cover is used for a trimmer having a rod at a front end of which a rotating cutter is provided, said protection cover further comprising:

position adjusting means for adjusting a position of said protection portion vertically.

10. A protection cover for said trimmer according to claim 9, wherein said position adjusting means comprises a connection portion attached to said protection portion and a supporting member connected to said connection portion for supporting a vertical position of said protection portion at a predetermined position.

11. A protection cover for said trimmer according to claim 10, wherein said connection portion comprises a prolonged hole formed in the protection portion.

12. A protection cover for said trimmer according to claim 9, wherein said position adjusting means comprises a retaining member attached to said wall portion, a shaft for rotatably retaining said retaining member with respect to said rod, and an angle keeping member for keeping said wall portion at a predetermined connecting angle with respect to said rod.

13. A protection cover for said trimmer according to claim 9, wherein said position adjusting means comprises an angle adjusting portion for adjusting a connecting angle of said wall portion in stepwise or in continuous with respect to said rod.

14. A protection cover for said trimmer according to claim 9, wherein said protection portion comprises a margin at an upper end thereof to allow said protection portion to shift vertically.

15. A protection cover for preventing chips therein from scattering, said cover is used for a trimmer having a rod at a front end of which a rotating cutter is provided, said protection cover comprising:

a wall portion disposed by said cutter;

a protection portion connected to said wall portion for preventing said chips from scattering rearward by rotational force of said cutter; and angle adjusting means for adjusting an angle of said wall portion.

16. A protection cover for said trimmer according to claim 15, wherein said angle adjusting means comprises a retaining member attached to said wall portion, a shaft for rotatably retaining said retaining member with respect to said rod, and an angle keeping member for keeping said wall portion at a predetermined connecting angle with respect to said rod.

17. A protection cover for said trimmer according to claim 15, wherein said angle adjusting means comprises an angle adjusting portion for adjusting a connecting angle of said wall portion in stepwise or in continuous with respect to said rod.

18. A trimmer comprising said protection cover set forth in claim 1, 9 or 15.

19. A protection cover for a trimmer comprising:

a protection portion disposed between a cutter of said trimmer and a position for an operator for preventing chips therein from scattering toward the position for the operator; and means for attaching said protection portion on said trimmer, wherein said protection portion comprises a first portion to be attached to said trimmer, and a second portion integrally connected to said first portion, said second portion comprising plural elastic members which contact ground.

20. A protection cover for a trimmer comprising:

a protection portion disposed between a cutter of said trimmer and a position for an operator, said protection portion comprising a first portion to be attached to said trimmer, and a second portion connected to said first portion, said second portion has plural members which deform to allow said second portion to trace a projection on ground.

21. A protection cover for preventing chips therein from scattering, said cover is used for a trimmer having a rod at a front end of which a rotating cutter is provided, said protection cover comprising:

a wall portion disposed by said cutter;

a protection portion connected to said wall portion for preventing said chips from scattering rearward by rotational force of said cutter, said protection portion comprising plural elastic members which contact ground; and position adjusting means for adjusting a position of said protection portion vertically.

22. A protection cover for said trimmer according to claim 20, further comprising angle adjusting means for adjusting an angle of said wall portion.

23. A protection cover for preventing chips therein from scattering, said cover is used for a trimmer having a rod at a front end of which a rotating cutter is provided, said protection cover comprising:

a wall portion disposed by said cutter;

a protection portion connected to said wall portion for preventing said chips from scattering rearward by rotational force of said cutter, said protection portion comprising plural elastic members; and angle adjusting means for adjusting an angle of said wall portion.

24. A protection cover for preventing chips therein from scattering, said cover is used for a trimmer having a rod at a front end of which a rotating cutter is provided, said protection cover comprising:

a wall portion disposed by said cutter;

a protection portion connected to said wall portion for preventing said chips from scattering rearward by rotational force of said cutter;

position adjusting means for adjusting a position of said protection portion vertically; and angle adjusting means for adjusting an angle of said wall portion.

25. A protection portion connected to a wall portion of a protection cover for preventing chips therein from scattering, said cover is used for a trimmer having a rod at a front end of which a rotating cutter is provided, said protection portion comprising:

a connection portion connected to said wall portion; and plural protection strips which deform independently.

26. A protection portion in combination with a wall portion of a protection cover according to claim 25, wherein said connection portion is connected to said wall portion in a manner to allow said connection portion to shift in a longitudinal direction of said protection strips.

27. A protection cover for preventing chips therein from scattering, said cover is used for a trimmer having a rod at a front end of which a rotating cutter cord is provided, said protection cover comprising:

a wall portion disposed by said cutter cord;

a protection portion disposed at the rear of said cutter cord for preventing said chips from scattering rearward by rotational force of said cutter cord, said protection portion comprising plural elastic members which contact ground; and means for guarding said protection portion against interference of said cutter cord.

28. A protection cover for said trimmer according to claim 27, wherein said guarding means is a reinforced part in said elastic members.

29. A protection cover for preventing chips therein from scattering, said cover is used for a trimmer having a rod at a front end of which a rotating cutter is provided, said protection cover comprising:

a wall portion disposed by said cutter; and a protection portion disposed at the rear of said cutter for preventing said chips from scattering rearward by rotational force of said cutter, wherein a part of said protection portion contacts ground and comprises plural elastic members.

* * * * *